Feb. 18, 1969  G. L. RICHARD  3,428,789

CONTROL APPARATUS

Filed Aug. 13, 1964

INVENTOR.
GORDON L. RICHARD
BY Roger W. Jensen
ATTORNEY

United States Patent Office 3,428,789
Patented Feb. 18, 1969

3,428,789
CONTROL APPARATUS
Gordon L. Richard, Eau Gallie, Fla., assignor to Honeywell Inc., Minneapolis, Minn., a corporation of Delaware
Filed Aug. 13, 1964, Ser. No. 389,446
U.S. Cl. 235—150.25
Int. Cl. G06g 7/78
8 Claims

ABSTRACT OF THE DISCLOSURE

An attitude pick-off for an inertial platform in the form of a floated sphere. Transmitter means are placed at the surface of the sphere in a given angular relationship and receiver means are placed at the inner surface of the housing in a given angular relationship. When a transmitted pulse reaches the receiver means through the floatation fluid, the angular distance of the receiver means from the transmitter means is measured and the angular relationship (attitude) of the sphere and the housing can be computed.

---

This invention pertains to pickoff means for determining the orientation of a floated member and more particularly pickoff means for determining the orientation of three axes of a member suspended in a fluid within a cavity in a base means with respect to three orthogonal axes of said base means.

As inertial systems and the like have become more predominant the use of a plurality of gimbals to mount such systems has become less practical. In recent years it has been found that a great reduction in cost and susceptibility to shock can be obtained by mounting the inertial components in a spherical shell and floating the spherical shell within a spherical cavity in a base means or housing. However, this type of mounting has a major drawback in that the attitude of the housing relative to the inertially stable spherical shell is extremely difficult to obtain.

In prior art devices complex forms of capacitor pickoffs, coded magnetic coating applied to the outer surface of the inner sphere and detected by sensing devices, and visually determining the orientation have been proposed. These methods of determining the orientation are too complex, inaccurate or impractical for an inertial system.

In the present invention a plurality of transmitters, which in this embodiment are piezoelectric transducers capable of converting electrical energy to acoustical waves in the fluid surrounding the inner sphere, are mounted at predetermined, spaced apart points on the surface of the inner sphere. An equal amount of receivers, which are also piezoelectric transducers capable of converting acoustical waves to electrical signals, are mounted on the inner spherical surface of the housing at predetermined, spaced apart intervals. However, this embodiment is not critical and the transmitters could be mounted on the housing while the receivers could be mounted on the sphere. In the disclosed embodiment acoustical frequency signals are utilized in conjunction with spherical shaped members because the acoustical signals will travel along the surface of the sphere and cannot travel through the sphere itself. The boundaries or interfaces between the fluid and the surface of the inner sphere and the spherical cavity offers a very high impedance for most acoustical frequencies.

Each of the receivers has a counter connected to it which produces an electrical signal indicative of the amount of time the counter is activated. The transmitters are pulsed, or energized, in a predetermined time sequence with a sufficient amount of time between activation of transmitters for the signals in the fluid to reach all of the receivers. Although activation of the transmitters takes place in a predetermined time sequence in the disclosed embodiment it should be understood that the transmitters could be tuned to each operate at a different frequency. The transmitters could then be activated simultaneously and the receivers, through selectively tuned circuits, could recognize and separate the signals from each transmitter and pass these signals on to the appropriate counters. The device which energizes the transmitters also sends each pulse across the gap between the sphere and the housing by means of electrical bushes which are connected to all of the counters in parallel.

When a pulse energizes one of the transmitters it simultaneously activates all of the counters connected to the receivers. The transmitter produces a signal in the fluid between the sphere and the housing which subsequently reaches and energizes each of the receivers. The receivers, upon receiving a signal through the fluid, produce an electrical signal which is applied to their respective counters to deactivate the counters. Thus, the counter measures the length of time that is required for the pulse to travel from a particular transmitter to each of the plurality of receivers. By multiplying the measured time by the tangential velocity of the sound waves through the liquid along the surface of the sphere, direction angles between the housing axes and the inner sphere, or space fixed axes are determined.

Thus, a relatively simple and extremely accurate pickoff device is disclosed which is capable of determining the orientation of three axes of a member suspended in a fluid within a cavity in a base means with respect to three axes of said base means. It should be noted that, while a sphere floated in a spherical cavity and transducers operating at acoustical frequencies are utilized for explanational purposes, the invention is capable of determining the orientation of any member with respect to some other member in three dimensions and any frequency of transmission may be utilized. In utilizing a different geometric configuration or a higher frequency the signals will not necessarily follow the surface of the member as previously explained.

It is a primary object of this invention to provide an improved control apparatus.

It is a further object of this invention to provide pickoff means for determining the orientation of a member suspended in a fluid with respect to a base means containing the member and the fluid.

These and other objects of this invention will become apparent from the following description of an embodiment thereof and the accompanying specification, claims, and drawings, of which:

Figure 1:
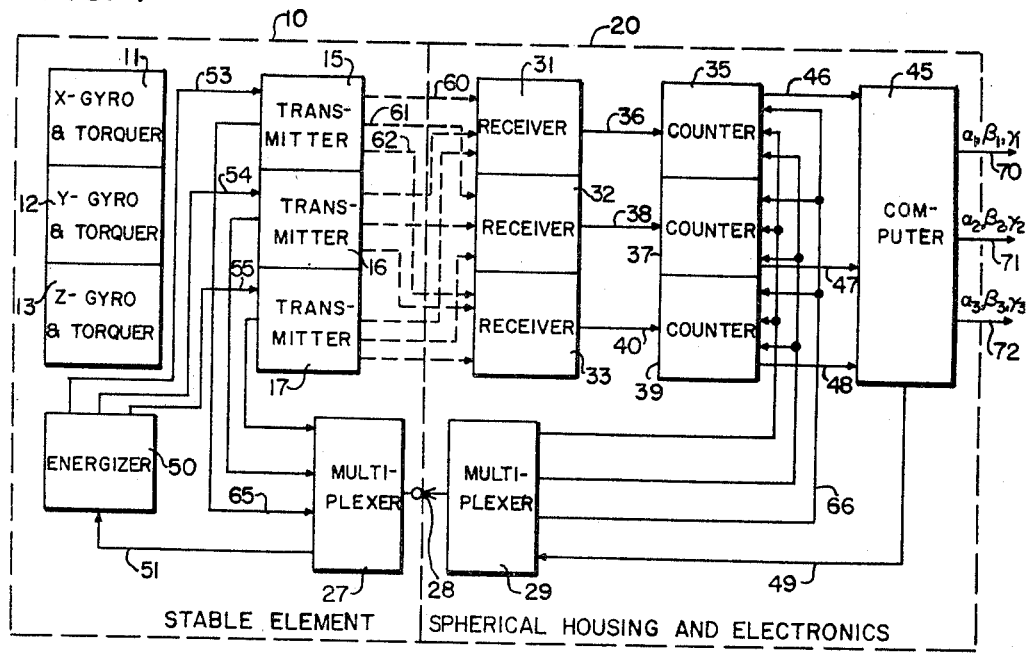
FIGURE 1 is a block diagram of the present invention.

In FIGURE 1 the numeral 10 designates a stable element which in the present embodiment is a sphere containing three gyros 11, 12 and 13. The gyro 11 is oriented so that its input axis is along an axis of the sphere designated X. The gyro 12 is oriented so that its input axis is along an axis of the sphere designated Y. The gyro 13 is oriented so that its input axis is along an axis of the sphere designated Z. The axes, X, Y and Z, of the sphere are mutually orthogonal axes for convenience. The gyros along with associated torquers for torquing the sphere about each of the respective orthogonal axes maintain the sphere stable in space in a manner well known in the art. The torquers may be of the fluid jet type or simply sections of an inductive motor placed on the inner sphere 10 and on the outer case.

Figure 2:
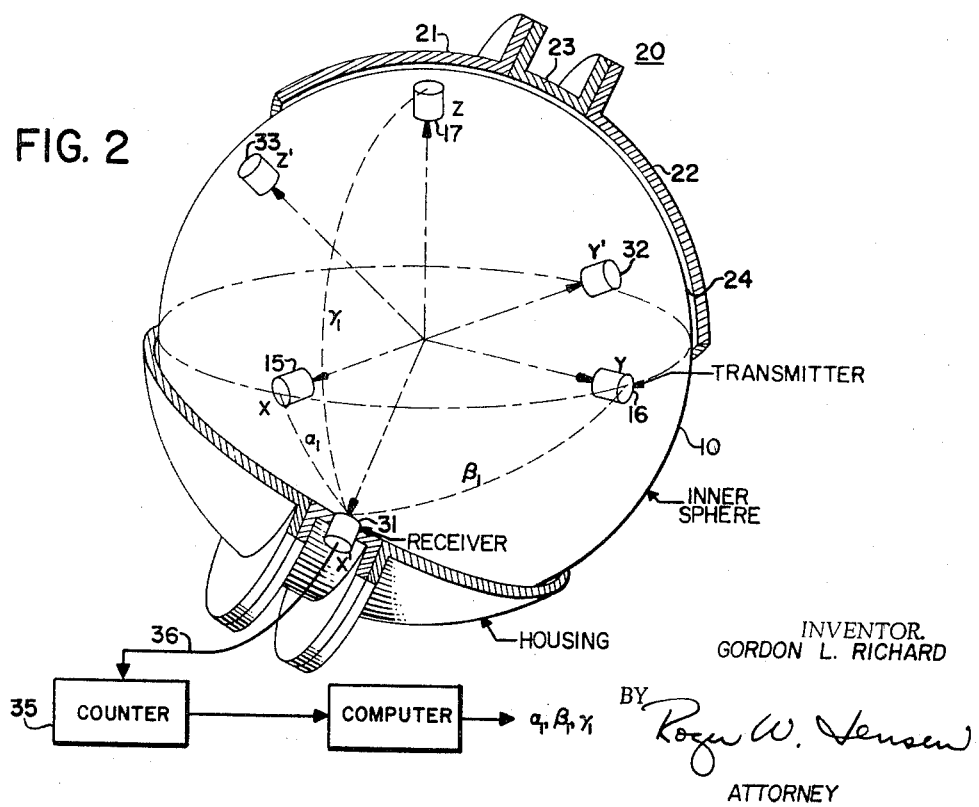
FIGURE 2 is a partial cross sectional view of an embodiment of the present invention.

Also mounted on the stable element or sphere 10 are three transmitters 15, 16 and 17. In this embodiment the transmitters are transducers capable of converting electrical energy to acoustical waves in a fluid. However, it should be understood that these transmitters could be any device which will transmit energy through a medium to a receiver. Referring to FIGURE 2 transmitter 15 is mounted along the X axis of the sphere 10 and in a manner so that the active portion of the transmitter 15 is at the outer periphery of sphere 10. The transmitter 16 is mounted along the Y axis of sphere 10 in a manner so that the active portion of that transmitter is also at the outer periphery of sphere 10. Transmitter 17 is mounted along the Z axis so that its active portion is at the outer periphery of sphere 10.

Referring to FIGURE 2 a housing generally designated 20 can be seen. In the present embodiment the housing 20 is made up of two hemispherical portions 21 and 22 which are joined by means of a third portion 23. When the three portions 21, 22 and 23 are joined as shown in FIGURE 2 they provide an inner spherical cavity 24 having a diameter slightly larger than the outer diameter of the sphere 10. The cavity 24 contains a fluid which has a specific gravity substantially the same as the specific gravity of the sphere 10. Thus, the sphere 10 is suspended within the cavity and substantially concentric therewith.

The housing 20 is constructed in three portions 21, 22 and 23 for ease in transferring signals and power between the sphere 10 and electronics located outside of the housing 20. The hemispherical portions 21 and 22 are both composed of a conducting material while the portion 23 which is utilized to join the hemispherical portions 21 and 22 is composed of a nonconductive or insulating material. Signals or power which it is desired to apply to the sphere 10 are then applied across the housing 20 so that hemisphere 21 acts as one terminal while hemisphere 22 acts as the other terminal. The sphere 10 has a plurality of brushes mounted thereon, not shown, in a manner such that at least one brush is always slidably connected to each hemisphere 21 and 22. The signals to be sent from the sphere 10 to the outer electronics are processed by a multiplexer 27, shown in FIGURE 1, which passes them through the brushes, illustrated in FIGURE 1 as a single line and brush 28, to a multiplexer 29 which is located in the electronics outside of the housing 20. This process is reversed for passing power and signals into the sphere 10.

In FIGURE 1 the dotted square designated 20 is representative of the housing 20, pictorially illustrated in FIGURE 2, and the external electronics are included therein. Mounted on the housing 20 are three receivers 31, 32 and 33. In this embodiment each of the three receivers is a transducer capable of converting acoustical signals to electrical signals. The three receivers 31, 32 and 33 are mounted along three orthogonal axes of the housing 20 designated X', Y' and Z' respectively. The receivers are mounted on the inner surface of the housing 20 so that any signals prevalent in the fluid in the cavity 24 will activate the receivers thereby producing an electrical signal.

Receiver 31 is electrically connected to a counter 35 by means of a lead 36. Receiver 32 is electrically connected to a counter 37 by means of a lead 38. Receiver 33 is electrically connected to a counter 39 by means of a lead 40. The inputs to the counters 35, 37 and 39 from the receivers 31, 32 and 33 respectively are utilized to deactivate the counters once they have been activated by signals which will be explained below. Counter 35 is connected to a first input of a computer 45 by means of a lead 46. Counter 37 is connected to a second input of computer 45 by a lead 47. Counter 39 is connected to a third input of computer 45 by a lead 48.

A first output of the computer 45 having synchronization pulses thereon is connected to the external multiplexer 29 by means of a lead 49. The synchronization pulses are multiplexed in the multiplexer 29 and applied to the brushes 28 and thereby to the internal multiplexer 27. The internal multiplexer 27 then applies the synchronization pulses to an energizer 50 by means of a lead 51. It should be noted that the internal multiplexer 27 and the external multiplexer 29 are not a necessary part of this invention and are utilized for simplicity. The invention would also work if each of the separate signals to be passed between the sphere 10 and the external electronics had a separate brush system. If it is desired to utilize a separate brush system for each signal to be applied or received from the sphere 10 the invention, as explained, could be utilized, but the signals would still have to be time shared since there are only in effect, two input terminals, hemisphere 21 and hemisphere 22.

Energizer 50 has three outputs which are connected to the transmitters 15, 16 and 17 by leads 53, 54 and 55 respecitvely. For each synchronization pulse on lead 51 applied to energizer 50 a transmitter energizing pulse appears on one of the leads 53, 54 or 55. Each of the energizing pulses appears, sequentially, on its respective lead a predetermined time after the previous pulse. Thus, a pulse appears on lead 53 and transmitter 15 is energized, thereby, producing a signal in the fluid in cavity 24 which subsequently reaches receivers 31, 32 and 33, as shown by dotted lines 60, 61 and 62 respectively. Simultaneous with the production of a signal in the fluid contained in cavity 24 by transmitter 15 an electrical signal is applied to multiplexer 27 by means of a lead 65. This electrical signal passes through brush 28 to multiplexer 29 where it is supplied to a lead 66 which is connected to activation inputs of all three counters 35, 37 and 39. It should be noted that the electrical signal actually activates all three counters simultaneously with the beginning of the transmission of the signal in the fluid.

Thus, as the signal first starts through the fluid from the transmitter 15 the three counters 35, 37 and 39 begin counting. Subsequently the signal in the fluid reaches the three receivers 31, 32 and 33 which produce electrical signals. The electrical signals from the receivers 31, 32 and 33 are applied to the counters 35, 37 and 39 respectively to deactivate the counters. Upon the deactivation of the counters 35, 37 and 39 an electrical signal is produced which is indicative of the amount of time each counter was activated. Thus, counter 35 produces an electrical signal on lead 46 which is indicative of the time required for a pulse to travel from transmitter 15 to receiver 31, counter 37 produces an electrical signal on lead 47 which is indicative of the time required for a pulse to travel from transmitter 15 to receiver 32, and counter 39 produces an electrical signal on lead 48 which is indicative of the time required for a pulse to travel from transmitter 15 to receiver 33.

After a sufficient amount of time has been allowed for the transmitter pulse to reach all three receivers a second energization pulse appears on lead 54 and transmitter 16 is energized. After a sufficient amount of time is allowed for the pulse produced by transmitter 16 to reach all three receivers a third pulse appears on lead 55 and transmitter 17 is energized.

The electrical signals applied to the computer from the counters 35, 37 and 39 which are indicative of the time required for a pulse to travel from each of the transmitters to each of the receivers is muliplied in the computer 45 by a factor equivalent to the angular velocity of the sound waves through the liquid contained in the cavity 24. Thus, nine direction angles between the three orthogonal axes X, Y and Z of the sphere 10 and the three orthogonal axes X', Y' and Z' of the housing 20 are provided by the computer 45. In FIGURE 2 the distance, or the direction angle, from the receiver 31 to the transmitter 15 is denoted as $\alpha_1$, the distance from the receiver 31 to the transmitter 16 is denoted as $\beta_1$ and the distance or the direction angle from the receiver 31 to the transmitter 17 is denoted as $\gamma_1$. Electrical signals indicative of the direction angles $\alpha_1$, $\beta_1$ and $\gamma_1$ appear at an output 70 of computer 45. The direction angles from each of the transmitters 15, 16 and 17 to receiver 32 are denoted $\alpha_2, \beta_2$ and $\gamma_2$. Electrical signals indicative of these direction angles appear at an output 71 of computer 45. Direction angles between receiver 33 and transmitters 15, 16 and 17 are denoted $\alpha_3, \beta_3$ and $\gamma_3$. Electrical signals indicative of these direction angles appear on an output 72 of the computer 45.

It should be noted that in the case of loss of a transmitter or a receiver or any three direction angles, the system will continue to provide the nine direction angles from the computer 45. The missing three angles can be found by forming the vector product of unit vectors situated along the two housing 20 axes which have mounted thereon the two operative receivers.

The nine direction angles define the orientation of the three orthogonal axes X, Y and Z of the sphere 10 relative to the three orthogonal axes X', Y' and Z' of the housing 20. Thus, a pickoff means has been described which can accurately determine the orientation of an inertially stable floated platform with respect to the housing in which it is floated.

While I have shown and described a preferred embodiment of this invention, further modifications and improvements will occur to those skilled in the art. I desire it to be understood, therefore, that this inventiotn is not liimted to the particular form shown and I intend in the appended claims to cover all modifications which do not depart from the spirit and scope of this invention.

What I claim is:

1. Pickoff means for determining the orientation of a floated sphere comprising:
    (a) base means having a fluid therein;
    (b) a sphere floated in said fluid;
    (c) transmitting means mounted on said sphere in a predetermined, spaced apart orientation;
    (d) receiving means mounted on said base means in a predetermined, spaced apart orientation;
    (e) means connected to said transmitting means for activating said transmitting means in a predetermined time sequence;
    (f) signal processing means connected to receive input signals from said receiving means; and
    (g) means connected to said activating means and said signal processing means for applying signals to said signal processing means simultaneous with activation of said transmitting means, said signal processing means utilizing said signals and input signals from said receiving means to produce output signals indicative of the orientation of said receiving means in relation to said transmitting means.

2. Pickoff means for determining the orientation of a floated sphere comprising:
    (a) base means having a spherical cavity therein;
    (b) a sphere having an outer diameter slightly smaller than the inner diameter of said cavity, said sphere being contained within said cavity;
    (c) fluid having a specific gravity substantially the same as said sphere and contained within said cavity so as to maintain said sphere substantially concentric with said cavity;
    (d) transmitting means mounted on said sphere in a predetermined, spaced apart orientation and in contact with said fluid for producing signals in said fluid when said transmitting means are activated;
    (e) receiving means mounted on said base means in a predetermined, spaced apart orientation for receiving signals prevalent in said fluid;
    (f) means connected to said transmitting means for activating said transmitting means in a predetermined time sequence;
    (g) signal processing means connected to receive input signals from said receiving means; and
    (h) means connected to said activating means and said signal processing means for applying signals to said signal processing means simultaneous with activation of said transmitting means, said signal processing means utilizing said signals and input signals from said receiving means to produce output signals indicative of the orientation of said receiving means in relation to said transmitting means.

3. Pickoff means for determining the orientation of a floated sphere comprising:
    (a) base means having a spherical cavity therein;
    (b) a sphere having an outer diameter slightly smaller than the inner diameter of said cavity, said sphere being contained within said cavity;
    (c) fluid having a specific gravity substantially the same as said sphere and contained within said cavity so as to maintain said sphere substantially concentric with said cavity;
    (d) three transducers mounted on said sphere along three orthogonal axes of said sphere and in contact with said fluid for producing signals in said fluid when said transducers are activated;
    (e) three transducers mounted on said base means along three orthogonal axes of said base means and in contact with said fluid for receiving signals prevalent in said fluid;
    (f) means connected to said transducers on said sphere for activating said transducers in a predetermined time sequence;
    (g) signal processing means connected to receive input signals from said transducer on said base means; and
    (h) means connected to said activating means and said signal processing means for applying signals to said signal processing means simultaneous with activation of said transducers on said sphere, said signal processing means utilizing said signals and input signals from said transducers on said base means to produce output signals indicative of the alignment angles between the orthogonal axes of said sphere and the orthogonal axes of said base means.

4. Pickoff means for determining the orientation of a floated member comprising:
    (a) base means having a cavity containing fluid therein;
    (b) a member floater in said fluid;
    (c) transmitting means mounted on said member in a predetermined, spaced apart orientation;
    (d) receiving means mounted on said base means in a predetermined, spaced apart orientation;
    (e) means connected to said transmitting means for activating said transmitting means in a predetermined time sequence;
    (f) signal processing means connected to receive input signals from said receiving means; and
    (g) means connected to said activating means and said signal processing means for applying signals to said signal processing means simultaneous with activation of said transmitting means, said signal processing means utilizing said signals and input signals from said receiving means to produce output signals indicative of the orientation of said receiving means in relation to said transmitting means.

5. Pickoff means for determining the orientation of three axes of a member suspended in a fluid within a cavity in a base means with respect to three axes of said base means comprising:
    (a) transmitting means having an electrical output and associated with said member for producing a signal in said fluid and simultaneously providing an electrical signal at said electrical output;
    (b) receiving means associated with said base means for receiving signals in said fluid and converting such signals to electrical signals; and
    (c) timing means activated by said electrical signal from said transmitting means and deactivated by said electrical signals from said receiving means at some finite later time, said timing means providing an electrical signal indicative of said finite time.

6. Pickoff means for determining the orientation of three axes of a member suspended in a fluid within a cavity in a base means with respect to three axes of said base means comprising:
   (a) transmitting means having electrical outputs and associated with said member for producing signals in said fluid and simultaneously providing electrical signals at said electrical outputs;
   (b) receiving means associated with said base means for receiving signals in said fluid and converting such signals to electrical signals;
   (c) timing means activated by said electrical signals from said transmitting means and deactivated by said electrical signals from said receiving means, said timing means providing electrical signals indicative of the time during which said timing means is activated; and
   (d) computing means utilizing said electrical signals from said timing means for computing said orientation of said three axes of said member with respect to said three axes of said base means.

7. Pickoff means for determining the orientation of three axes of a member suspended in a fluid within a cavity in a base means with respect to three axes of said base means comprising:
   (a) three transmitting transducers mounted on said member along said three orthogonal axes of said member and in contact with said fluid for producing signals in said fluid when said transducers are energized;
   (b) energizing means having a first electrical output connected to sequentially energize said transmitting transducers and a simultaneous second electrical output;
   (c) three receiving transducers mounted on said base means along said three axes of said base means and in contact with said fluid for receiving signals prevalent in said fluid and converting them to electrical signals; and
   (d) three timing means activated by said second electrical output of said energizing means and deactivated respectively by said electrical signals from said three receiving means, said three timing means providing a plurality of electrical signals indicative of the time during which said timing means are activated.

8. Pickoff means for determining the orientation of three axes of a member suspended in a fluid within a cavity in a base means with respect to three axes of said base means comprising:
   (a) three transmitting transducers mounted on said member along said three axes of said member and in contact with said fluid for producing signals in said fluid when said transducers are energized;
   (b) energizing means having a first electrical output connected to sequentially energize said transmitting transducers and a simultaneous second electrical output;
   (c) three receiving transducers mounted on said base means along said three axes of said base means and in contact with said fluid for receiving signals prevalent in said fluid and converting them to electrical signals;
   (d) three timing means activated by said second electrical output of said energizing means and deactivated respectively by said electrical signals from said three receiving means, said three timing means providing a plurality of electrical signals indicative of the time during which said timing means are activated; and
   (e) computing means utilizing said electrical signals from said timing means for computing said orientation of said three axes of said member with respect to said three axes of said base means.

References Cited

UNITED STATES PATENTS 3,064,241  11/1962  Schneider _____ 333—30 XR

MALCOLM A. MORRISON, *Primary Examiner.*

W. M. JOHNSON, *Assistant Examiner.*

U.S. Cl. X.R.

340—6, 16; 244—1; 74—5.34, 5.6